US008666157B2

(12) United States Patent
Doll

(10) Patent No.: US 8,666,157 B2
(45) Date of Patent: Mar. 4, 2014

(54) COLOR SEGMENTING A RASTER IMAGE

(75) Inventor: Joseph Dean Doll, Broomfield, CO (US)

(73) Assignee: Colorcom, Ltd., Broomfield, CO (US)

( * ) Notice: Subject to any disclaimer, the term of this patent is extended or adjusted under 35 U.S.C. 154(b) by 341 days.

(21) Appl. No.: 13/177,924

(22) Filed: Jul. 7, 2011

(65) Prior Publication Data

US 2013/0011054 A1 Jan. 10, 2013

(51) Int. Cl.
*G06K 9/34* (2006.01)

(52) U.S. Cl.
USPC .......... 382/164

(58) Field of Classification Search
USPC .......... 382/128, 141–152, 163–164
See application file for complete search history.

(56) References Cited

U.S. PATENT DOCUMENTS

| | | | | |
|---|---|---|---|---|
| 6,226,400 | B1 | 5/2001 | Doll | |
| 6,310,970 | B1 | 10/2001 | Doll | |
| 6,324,300 | B1 | 11/2001 | Doll | |
| 6,393,146 | B1 | 5/2002 | Doll | |
| 6,396,947 | B1 | 5/2002 | Doll | |
| 6,728,399 | B1 | 4/2004 | Doll | |
| 7,376,275 | B2 | 5/2008 | Simard et al. | |
| 7,813,539 | B2 * | 10/2010 | Shibuya et al. | 382/141 |

* cited by examiner

*Primary Examiner* — Duy M Dang
(74) *Attorney, Agent, or Firm* — Howard H. Sheerin

(57) ABSTRACT

An apparatus for processing a raster image comprising a plurality of pixels is disclosed. The apparatus comprises a non-transitory computer readable medium for storing steps of a computer program, and a computer processor connected to the non-transitory computer readable medium for executing the steps of the computer program. A plurality of horizontal axial blobs are identified in the raster image, a plurality of vertical axial blobs are identified in the raster image, and the horizontal and vertical axial blobs are linked into a feature blob.

4 Claims, 6 Drawing Sheets

| Row | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|
| 6 | 251 | 251 | 251 | 251 | 251 | 251 | 251 | 251 | 251 | 251 | 251 | 251 | 251 | 251 | 251 | 251 | 251 | 251 | 251 | 251 | 251 | 251 |
| 7 | 251 | 251 | 251 | 251 | 251 | 251 | 251 | 251 | 251 | 251 | 251 | 251 | 251 | 251 | 251 | 251 | 251 | 251 | 251 | 251 | 251 | 251 |
| 8 | 251 | 251 | 251 | 251 | 251 | 251 | 251 | 251 | 251 | 251 | 251 | 251 | 251 | 251 | 251 | 251 | 251 | 251 | 251 | 251 | 251 | 251 |
| 9 | 250 | 212 | 194 | 181 | 183 | 190 | 192 | 210 | 249 | 246 | 251 | 251 | 251 | 251 | 251 | 251 | 251 | 251 | 251 | 251 | 251 | 251 |
| 10 | 252 | 244 | 194 | 99 | 92 | 121 | 222 | 252 | 248 | 250 | 251 | 251 | 251 | 251 | 251 | 251 | 251 | 251 | 251 | 251 | 251 | 251 |
| 11 | 250 | 251 | 247 | 125 | 92 | 161 | 252 | 248 | 248 | 250 | 251 | 251 | 251 | 251 | 251 | 251 | 251 | 251 | 251 | 251 | 251 | 251 |
| 12 | 251 | 248 | 248 | 126 | 95 | 157 | 251 | 252 | 252 | 251 | 251 | 251 | 251 | 251 | 251 | 251 | 251 | 251 | 251 | 251 | 251 | 251 |
| 13 | 252 | 252 | 246 | 126 | 91 | 163 | 247 | 250 | 251 | 249 | 249 | 251 | 248 | 247 | 249 | 250 | 251 | 248 | 250 | 250 | 251 | 252 |
| 14 | 252 | 252 | 248 | 128 | 91 | 160 | 250 | 250 | 250 | 245 | 190 | 153 | 243 | 231 | 162 | 138 | 165 | 231 | 251 | 253 | 250 | 252 |
| 15 | 252 | 252 | 250 | 130 | 91 | 156 | 251 | 251 | 212 | 141 | 90 | 100 | 171 | 118 | 117 | 87 | 89 | 146 | 251 | 252 | 252 | 252 |
| 16 | 252 | 252 | 249 | 131 | 91 | 156 | 251 | 247 | 246 | 227 | 93 | 84 | 122 | 215 | 243 | 194 | 91 | 104 | 227 | 254 | 249 | 252 |
| 17 | 252 | 252 | 251 | 129 | 92 | 149 | 250 | 251 | 250 | 224 | 101 | 96 | 227 | 250 | 251 | 233 | 107 | 96 | 214 | 252 | 250 | 251 |
| 18 | 252 | 252 | 247 | 132 | 89 | 157 | 252 | 252 | 249 | 225 | 99 | 100 | 234 | 250 | 250 | 239 | 108 | 92 | 216 | 253 | 249 | 253 |
| 19 | 252 | 252 | 251 | 133 | 89 | 150 | 250 | 252 | 249 | 229 | 98 | 97 | 234 | 248 | 253 | 244 | 115 | 94 | 214 | 252 | 250 | 252 |
| 20 | 252 | 252 | 250 | 143 | 91 | 154 | 248 | 252 | 249 | 234 | 103 | 93 | 231 | 249 | 251 | 250 | 131 | 92 | 208 | 251 | 251 | 250 |
| 21 | 250 | 252 | 245 | 129 | 87 | 131 | 249 | 252 | 252 | 226 | 100 | 99 | 209 | 252 | 251 | 242 | 115 | 90 | 192 | 251 | 252 | 247 |
| 22 | 251 | 249 | 248 | 133 | 87 | 145 | 251 | 250 | 252 | 226 | 99 | 96 | 232 | 251 | 250 | 242 | 113 | 92 | 213 | 249 | 252 | 248 |
| 23 | 251 | 252 | 244 | 127 | 90 | 137 | 250 | 250 | 250 | 227 | 100 | 98 | 234 | 251 | 250 | 243 | 109 | 88 | 206 | 254 | 246 | 247 |
| 24 | 251 | 239 | 188 | 103 | 100 | 100 | 195 | 245 | 239 | 174 | 100 | 94 | 176 | 244 | 244 | 200 | 97 | 97 | 146 | 237 | 249 | 251 |
| 25 | 247 | 211 | 203 | 206 | 207 | 198 | 201 | 221 | 230 | 205 | 199 | 213 | 208 | 237 | 242 | 213 | 213 | 205 | 216 | 230 | 252 | 253 |
| 26 | 251 | 251 | 254 | 251 | 251 | 251 | 250 | 253 | 251 | 250 | 250 | 250 | 250 | 251 | 251 | 253 | 250 | 251 | 251 | 249 | 249 | 250 |
| 27 | 253 | 255 | 250 | 252 | 251 | 250 | 252 | 250 | 246 | 253 | 251 | 252 | 249 | 250 | 250 | 250 | 252 | 252 | 251 | 253 | 251 | 251 |
| 28 | 251 | 250 | 250 | 251 | 249 | 252 | 251 | 251 | 251 | 250 | 251 | 250 | 253 | 250 | 250 | 252 | 249 | 250 | 253 | 249 | 251 | 252 |
| 29 | 252 | 252 | 252 | 252 | 252 | 252 | 251 | 251 | 251 | 251 | 251 | 251 | 251 | 251 | 251 | 251 | 251 | 251 | 251 | 251 | 251 | 251 |

FIG. 2A

| Row | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|
| 6 | 251 | 251 | 251 | 251 | 251 | 251 | 251 | 251 | 251 | 251 | 251 | 251 | 251 | 251 | 251 | 251 | 251 | 251 | 251 | 251 | 251 | 251 | 252 |
| 7 | 251 | 251 | 251 | 251 | 251 | 251 | 251 | 251 | 251 | 251 | 251 | 251 | 251 | 251 | 251 | 251 | 251 | 251 | 251 | 251 | 251 | 251 | 252 |
| 8 | 251 | 251 | 251 | 251 | 251 | 251 | 251 | 251 | 251 | 251 | 251 | 251 | 251 | 251 | 251 | 251 | 251 | 251 | 251 | 251 | 251 | 251 | 252 |
| 9 | 250 | 212 | 194 | 181 | 183 | 190 | 192 | 210 | 249 | 246 | 251 | 251 | 251 | 251 | 251 | 251 | 251 | 251 | 251 | 251 | 251 | 251 | 251 |
| 10 | 252 | 244 | 194 | 99 | 92 | 121 | 222 | 252 | 248 | 250 | 251 | 251 | 251 | 251 | 251 | 251 | 251 | 251 | 251 | 251 | 251 | 251 | 251 |
| 11 | 250 | 251 | 247 | 125 | 92 | 161 | 252 | 248 | 248 | 250 | 251 | 251 | 251 | 251 | 251 | 251 | 251 | 251 | 251 | 251 | 251 | 251 | 251 |
| 12 | 251 | 248 | 248 | 126 | 95 | 157 | 251 | 252 | 252 | 251 | 251 | 251 | 251 | 251 | 251 | 251 | 251 | 251 | 251 | 251 | 251 | 251 | 251 |
| 13 | 252 | 252 | 246 | 126 | 91 | 163 | 247 | 250 | 251 | 249 | 249 | 251 | 248 | 247 | 249 | 250 | 251 | 248 | 250 | 250 | 251 | 252 | 251 |
| 14 | 252 | 252 | 248 | 128 | 91 | 160 | 250 | 250 | 250 | 245 | 190 | 153 | 243 | 231 | 162 | 138 | 165 | 231 | 251 | 253 | 250 | 252 | 251 |
| 15 | 252 | 252 | 250 | 130 | 91 | 156 | 251 | 251 | 212 | 141 | 90 | 100 | 171 | 118 | 117 | 87 | 89 | 146 | 251 | 252 | 252 | 252 | 251 |
| 16 | 252 | 252 | 249 | 131 | 91 | 156 | 251 | 247 | 246 | 227 | 93 | 84 | 122 | 215 | 243 | 194 | 91 | 104 | 227 | 254 | 249 | 252 | 251 |
| 17 | 252 | 252 | 251 | 129 | 92 | 149 | 250 | 251 | 250 | 224 | 101 | 96 | 227 | 250 | 251 | 233 | 107 | 96 | 214 | 252 | 250 | 251 | 251 |
| 18 | 252 | 252 | 247 | 132 | 89 | 157 | 252 | 252 | 249 | 225 | 99 | 100 | 234 | 250 | 250 | 239 | 108 | 92 | 216 | 253 | 249 | 253 | 251 |
| 19 | 252 | 252 | 251 | 133 | 89 | 150 | 250 | 252 | 249 | 229 | 98 | 97 | 234 | 248 | 253 | 244 | 115 | 94 | 214 | 252 | 250 | 252 | 251 |
| 20 | 252 | 252 | 250 | 143 | 91 | 154 | 248 | 252 | 249 | 234 | 103 | 93 | 231 | 249 | 251 | 250 | 131 | 92 | 208 | 251 | 251 | 250 | 251 |
| 21 | 250 | 252 | 245 | 129 | 87 | 131 | 249 | 252 | 252 | 226 | 100 | 99 | 209 | 252 | 251 | 242 | 115 | 90 | 192 | 251 | 252 | 247 | 251 |
| 22 | 251 | 249 | 248 | 133 | 87 | 145 | 251 | 250 | 252 | 226 | 99 | 96 | 232 | 251 | 250 | 242 | 113 | 92 | 213 | 249 | 252 | 248 | 251 |
| 23 | 251 | 252 | 244 | 127 | 90 | 137 | 250 | 250 | 250 | 227 | 100 | 98 | 234 | 251 | 250 | 243 | 109 | 88 | 206 | 254 | 246 | 247 | 251 |
| 24 | 251 | 239 | 188 | 103 | 100 | 100 | 195 | 245 | 239 | 174 | 100 | 94 | 176 | 244 | 244 | 200 | 97 | 97 | 146 | 237 | 249 | 251 | 251 |
| 25 | 247 | 211 | 203 | 206 | 207 | 198 | 201 | 221 | 230 | 205 | 199 | 213 | 208 | 237 | 242 | 213 | 213 | 205 | 216 | 230 | 252 | 253 | 251 |
| 26 | 251 | 251 | 254 | 251 | 251 | 251 | 250 | 253 | 251 | 250 | 250 | 250 | 250 | 251 | 251 | 253 | 250 | 251 | 251 | 249 | 249 | 250 | 251 |
| 27 | 253 | 255 | 250 | 252 | 251 | 250 | 252 | 250 | 246 | 253 | 251 | 252 | 249 | 250 | 250 | 250 | 252 | 252 | 251 | 253 | 251 | 251 | 251 |
| 28 | 251 | 250 | 250 | 251 | 249 | 252 | 251 | 251 | 251 | 250 | 251 | 250 | 253 | 250 | 250 | 252 | 249 | 250 | 253 | 249 | 251 | 252 | 251 |
| 29 | 252 | 252 | 252 | 252 | 252 | 252 | 251 | 251 | 251 | 251 | 251 | 251 | 251 | 251 | 251 | 251 | 251 | 251 | 251 | 251 | 251 | 251 | 251 |

FIG. 2B

| Row | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|
| 6 | 251 | 251 | 251 | 251 | 251 | 251 | 251 | 251 | 251 | 251 | 251 | 251 | 251 | 251 | 251 | 251 | 251 | 251 | 251 | 251 | 251 |
| 7 | 251 | 251 | 251 | 251 | 251 | 251 | 251 | 251 | 251 | 251 | 251 | 251 | 251 | 251 | 251 | 251 | 251 | 251 | 251 | 251 | 251 |
| 8 | 251 | 251 | 251 | 251 | 251 | 251 | 251 | 251 | 251 | 251 | 251 | 251 | 251 | 251 | 251 | 251 | 251 | 251 | 251 | 251 | 251 |
| 9 | 250 | 212 | 194 | 181 | 183 | 190 | 192 | 210 | 249 | 246 | 251 | 251 | 251 | 251 | 251 | 251 | 251 | 251 | 251 | 251 | 251 |
| 10 | 252 | 244 | 194 | 99 | 92 | 121 | 222 | 252 | 248 | 250 | 251 | 251 | 251 | 251 | 251 | 251 | 251 | 251 | 251 | 251 | 251 |
| 11 | 250 | 251 | 247 | 125 | 92 | 161 | 252 | 248 | 248 | 250 | 251 | 251 | 251 | 251 | 251 | 251 | 251 | 251 | 251 | 251 | 251 |
| 12 | 251 | 248 | 248 | 126 | 95 | 157 | 251 | 252 | 252 | 251 | 251 | 251 | 251 | 251 | 251 | 251 | 251 | 251 | 251 | 251 | 251 |
| 13 | 252 | 252 | 246 | 126 | 91 | 163 | 247 | 250 | 251 | 249 | 249 | 251 | 248 | 247 | 249 | 250 | 251 | 248 | 250 | 250 | 251 |
| 14 | 252 | 252 | 248 | 128 | 91 | 160 | 250 | 250 | 250 | 245 | 190 | 153 | 243 | 231 | 162 | 138 | 165 | 231 | 251 | 253 | 250 |
| 15 | 252 | 252 | 250 | 130 | 91 | 156 | 251 | 251 | 212 | 141 | 90 | 100 | 171 | 118 | 117 | 87 | 89 | 146 | 251 | 252 | 252 |
| 16 | 252 | 252 | 249 | 131 | 91 | 156 | 251 | 247 | 246 | 227 | 93 | 84 | 122 | 215 | 243 | 194 | 91 | 104 | 227 | 254 | 249 |
| 17 | 252 | 252 | 251 | 129 | 92 | 149 | 250 | 251 | 250 | 224 | 101 | 96 | 227 | 250 | 251 | 233 | 107 | 96 | 214 | 252 | 250 |
| 18 | 252 | 252 | 247 | 132 | 89 | 157 | 252 | 252 | 249 | 225 | 99 | 100 | 234 | 250 | 250 | 239 | 108 | 92 | 216 | 253 | 249 |
| 19 | 252 | 252 | 251 | 133 | 89 | 150 | 250 | 252 | 249 | 229 | 98 | 97 | 234 | 248 | 253 | 244 | 115 | 94 | 214 | 252 | 250 |
| 20 | 252 | 252 | 250 | 143 | 91 | 154 | 248 | 252 | 249 | 234 | 103 | 93 | 231 | 249 | 251 | 250 | 131 | 92 | 208 | 251 | 251 |
| 21 | 250 | 252 | 245 | 129 | 87 | 131 | 249 | 252 | 252 | 226 | 100 | 99 | 209 | 252 | 251 | 242 | 115 | 90 | 192 | 251 | 252 |
| 22 | 251 | 249 | 248 | 133 | 87 | 145 | 251 | 250 | 252 | 226 | 99 | 96 | 232 | 251 | 250 | 242 | 113 | 92 | 213 | 249 | 252 |
| 23 | 251 | 252 | 244 | 127 | 90 | 137 | 250 | 250 | 250 | 227 | 100 | 98 | 234 | 251 | 250 | 243 | 109 | 88 | 206 | 254 | 246 |
| 24 | 251 | 239 | 188 | 103 | 100 | 100 | 195 | 245 | 239 | 174 | 100 | 94 | 176 | 244 | 244 | 200 | 97 | 97 | 146 | 237 | 249 |
| 25 | 247 | 211 | 203 | 206 | 207 | 198 | 201 | 221 | 230 | 205 | 199 | 213 | 208 | 237 | 242 | 213 | 213 | 205 | 216 | 230 | 252 |
| 26 | 251 | 251 | 254 | 251 | 251 | 251 | 250 | 253 | 251 | 250 | 250 | 250 | 250 | 251 | 251 | 253 | 250 | 251 | 251 | 249 | 249 |
| 27 | 253 | 255 | 250 | 252 | 251 | 250 | 252 | 250 | 246 | 253 | 251 | 252 | 249 | 250 | 250 | 250 | 252 | 252 | 251 | 253 | 251 |
| 28 | 251 | 250 | 250 | 251 | 249 | 252 | 251 | 251 | 251 | 250 | 251 | 250 | 253 | 250 | 250 | 252 | 249 | 250 | 253 | 249 | 251 |
| 29 | 252 | 252 | 252 | 252 | 252 | 252 | 251 | 251 | 251 | 251 | 251 | 251 | 251 | 251 | 251 | 251 | 251 | 251 | 251 | 251 | 251 |

VALLEY FEATURE BLOB

PEAK FEATURE BLOB

FIG. 4

COLOR SEGMENTING A RASTER IMAGE

BACKGROUND

Description of the Related Art

Image processing generally refers to the manipulation of pictorial data using computers. Computer Aided Design (CAD) is one example of how computers are used to draft complex engineering drawings such as mechanical, architectural or electrical drawings. Other examples of image processing include the manipulation of still photographs or cinema to achieve various effects such as feature enhancement, three-dimensional rendering, or animation. However, the term "image processing" is not limited to pictures—it generally refers to the digitization and computer processing of any analog signal that represents something physical and perceptible in the world. An audio signal can be digitized and processed with computers to perform manipulations such as noise reduction or voice recognition; modulated electrical signals, such as telecommunications or cardiograms, can be digitized and processed by computers to extract pertinent information, and so on. The common factor in image processing is the need to digitize the continuous-time analog signal into a discrete-time digital signal that can be operated on by computers using Boolean mathematics implemented in transistor logic circuits.

A common format for storing and manipulating digitized signals is simply to represent the digital data as a bit-map of pixels, where each pixel represents a particular characteristic (e.g., magnitude or color) of the analog signal. Typically, a picture is digitized into a bit-map of individual pixels where each pixel represents a color of the image in a very small, localized area. When the pixels are displayed as a congregation, the original picture appears without loss of perception to the human eye as long as there is sufficient resolution (number of pixels) both in spatial and color contexts. A black and white picture can be represented with one-bit pixels, where the state of the bit (0 or 1) represents the two colors, black and white. To digitize a picture comprising multiple colors, each pixel is represented using n-bits such that each pixel can take on one of 2n different colors. The process of converting an analog image into a bit-map image is referred to as "rasterizing" the image.

There are several well known problems with raster images that limit or inhibit the full potential of computer manipulation. The amount of memory necessary to store a large photograph having many colors (thousands or even millions of colors) can be immense, and the problem is exacerbated when attempting to digitize a series of photographs such as a scene in a movie. Not only do raster images require large amounts of storage memory, but processing such a large amount of data can be slow, particularly when attempting to transfer raster images over a network such as the internet.

The alternative is to convert the raster image into a mathematical format known as vectors. A vector is a mathematical description of the image which is not constrained by a fixed resolution as with raster data. Furthermore, vectors allow for a much more diverse range of image manipulations due to the mathematical representation of the image. A simple example of a vector is a line beginning at a particular X,Y point in a Cartesian plane and ending at another X,Y point in that plane. To date, however, converting raster images into a series of linear vectors has been largely unsuccessful. This is due to the immense number of different possible patterns that raster images can form. For example, a 3 by 3 pixel matrix of a nine color picture can take on about 21,000 different possible patterns. Each possibility must be accounted for when converting the image into a set of linear vectors. If just one more pixel is added to the matrix, the complexity increases exponentially. Consequently, techniques for converting raster images into linear vectors normally operate on only a small section of the image at a time. The problem with this approach is that the resulting vectorized image appears fragmented due to discontinuities when the individual sections are combined.

BRIEF DESCRIPTION OF THE DRAWINGS

FIG. 2A shows an example raster image comprising color pixels and the identification of horizontal axial blobs.

FIG. 2B shows the example raster image and the identification of vertical axial blobs.

FIG. 4 shows the resulting raster image after linking the horizontal and axial blobs into feature blobs (e.g., valley and peak feature blobs).

DETAILED DESCRIPTION OF EMBODIMENTS OF THE INVENTION

Figures 1A, 1B:
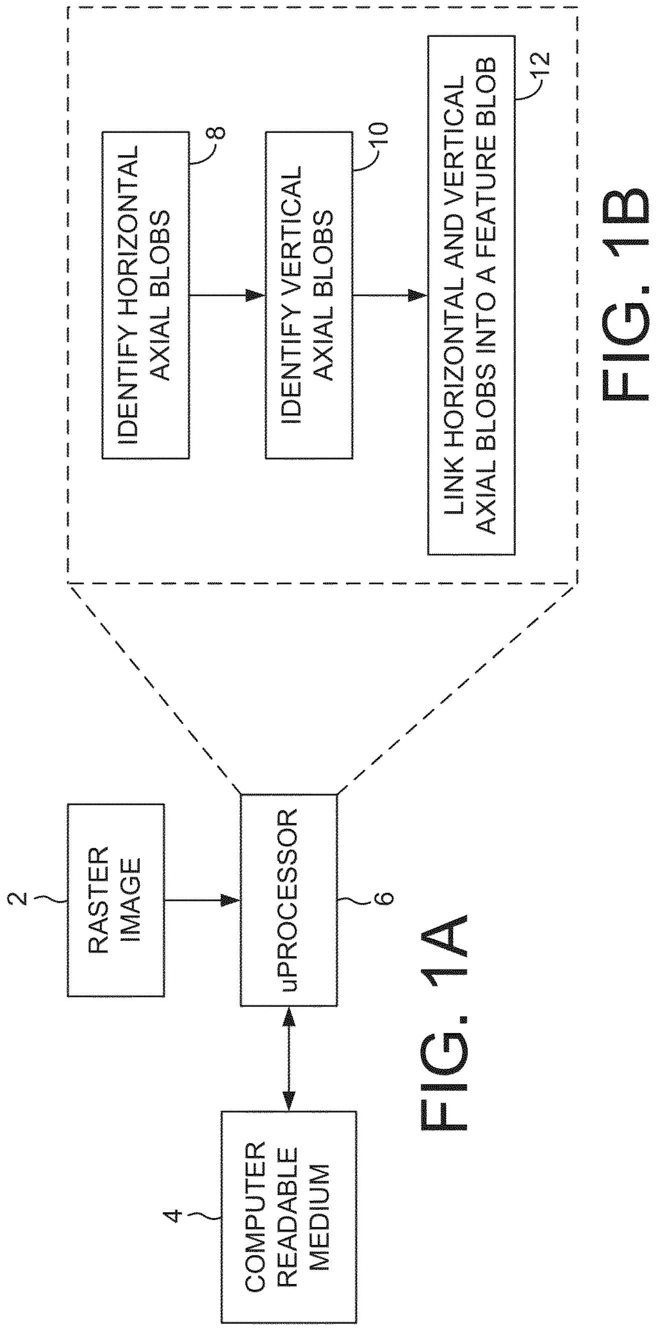
FIG. 1A shows an apparatus for processing a raster image including a microprocessor connected to a computer readable medium.
FIG. 1B is a flow diagram executed by the microprocessor for identifying horizontal and vertical axial blobs which are linked into a feature blob.

FIG. 1A shows an apparatus for processing a raster image 2 comprising a plurality of pixels, the apparatus comprising a non-transitory computer readable medium 4 for storing steps of a computer program, and a computer processor 6 connected to the non-transitory computer readable medium 4 for executing the steps of the computer program illustrated in the flow diagram of FIG. 1B. A plurality of horizontal axial blobs are identified in the raster image (step 8), a plurality of vertical axial blobs are identified in the raster image (step 10), and the horizontal and vertical axial blobs are linked into a feature blob (step 12).

FIG. 2A shows an example raster image comprising the letters "In" in a color pixilated format. Each pixel in the image is assigned a number between 0 and 255 where 0 represents black, 255 represents white, and the numbers between 0 and 255 represent varying shades of gray. Although the example shown in FIG. 2A is a grayscale image, the aspects of the present invention can be applied to any number of colors by increasing the number of bits representing each pixel. In the embodiments of the present invention, the pixels of the raster image are grouped (segmented) into features as a preliminary step of any suitable image processing algorithm, such as photographic enhancements, animation modeling, image compression, image filtering, video compression, video filtering, image recognition, and raster to vector conversion.

In one embodiment of the present invention, the color segmentation process comprises three steps. In the first step (Anchoring Stability), the stable parts of the raster image (the parts with very little color change) are locked together. In the second step (Restoring Edges), color contrast is restored to edges that have been eroded during sensing. In the third step (Feature Blob Formation), all pixels are grouped into a feature blob, and every feature blob is built to at least a minimum size.

Anchoring Stability

The areas of the image that are equal to or less than a predefined color difference are grouped into blobs. The grouping is performed with the following priority:

1. The pixels that are within the color tolerance of all other pixels that might already be in the blob and axially adjacent to at least one pixel in the blob are grouped into a blob.
2. The pixels that are within the color tolerance of all other pixels that might already be in the blob and cater-corner to at least one pixel in the blob are grouped into a blob.
3. The algorithm then loops through steps 1 and 2 while increasing the color tolerance 1 color level for each loop. The loop terminates when the color tolerance is greater than the color difference that is allowed.

Before a pixel is allowed into a blob, the pixel must not have a color difference that is greater than the color tolerance with any other pixel in the blob.

Restoring Edges

The first step in Restoring Edges is to define horizontal and axial blobs for each color. The two primary distortions in nearly all images is color erosion due to the subdivision of transition zones and lack of focus. Transition zone subdivision is from discrete semiconductor sensor elements, and the lack of focus is usually a depth of focus issue that is inherent in wave front optics (only one distance can be in focus). These two different distortions cause approximately the same type of image aberration which is color erosion. Assuming color erosion is the primary image aberration which is true in almost all cases and taking one primary color at a time, then all image artifacts can be reduced to either one of the following four types or a combination of two or more types of image artifacts:

- Peak: A peak occurs whenever the color level goes up a significant amount and then comes back down a significant amount.
- Valley: A valley occurs whenever the color level goes down a significant amount and then comes back up a significant amount.
- Terrace: A terrace occurs whenever the color level changes a significant amount and then for at least several pixels doesn't change a significant amount and then changes a significant amount with the same slope as the previous significant change.
- Smear: In the other types, a significant change occurs as the color changes from one object to the next. For example, a color valley might change from a white background (object 1) to a black foreground (object 2) to the white background (object 3) on the other side. In a smear, the change itself is the object. For example, rather than moving rapidly from black to white, the color level may meander through the gray for a number of pixels.

The following definitions are used in the algorithm for restoring edges.

- Color Difference: The color difference is the setting in the algorithm that defines a significant change. If the amount change in the color level exceeds the color difference, then a significant change has occurred.
- Axial Blob: A blob is a group of adjacent pixels that are the same color, but an array of pixels creates an unnecessarily difficult situation when applying certain techniques. To simplify things we dissect the image into rows (which transverse horizontally) or columns (which transverse vertically). Then we subdivide the row or column into a series of slopes. Each time the slope of the color changes signs and travels significantly, a new slope is started. The amount of color change that is needed to qualify as significant travel is set by a variable that is called the color difference. Sequences of either horizontal or axial blobs taken together approximate a blob, but the axial blobs often contain pixels that are outside of the blob. The pixels that are in the axial blob and near the original blob border are subject to tier one color correction.
- Extreme Borders: Extreme borders extend to an area that may be influenced by the artifact. For example, some pixels may not be inside the artifact, but they may have their color exchanged with an artifact during color correction. These pixels would be inside the extreme border. To state the same thing in the opposite sense, no color correction can occur between a pixel and an artifact if the pixel lies out the extreme border of the artifact. The extreme pixels of adjacent artifacts can overlap each other.
- Color Borders: The color border will become the actual border of the blob.
- Artifacts: There are four different type of artifacts: peaks, valleys, terraces, and smears.
- Peak Definition: A peak is defined by establishing the following points.
  - Extreme Borders: When the color level becomes greater and exceeds the color difference, the beginning border is established. On the other side of the peak the ending border is established with same logic but scanning in the opposite direction. Four possibilities exist.
    - Stability: If the color has been stable (i.e., no artifact), the beginning border is placed at the beginning of the change.
    - Valley: If the color was defined by a valley, the beginning border is the first significant color increase as the scan moves away from the valley.
    - Terrace: If the color was defined by a terrace, the beginning border is the first color increase on the terrace.
    - Smear: If the color was defined by a smear, the beginning border is the steepest color slope between the smear and the peak that has no significant color decreases on the way to the peak.
  - Color Borders: The color border is always at the steepest color slope. Extreme borders can overlap other artifacts, but color borders never overlap other artifacts. If pixels tie, the color border is the midpoint between the first and last pixels that tie.
  - Peak Color The peak color is the highest color in the axial blob. If pixels tie, the peak is the midpoint between the first and last pixels that tie.
- Valley Definition: A valley is defined by establishing the following points.
  - Extreme Borders: When the color level becomes less and exceeds the color difference, the beginning border is established. On the other side of the valley the ending border is established with same logic but scanning in the opposite direction. Four possibilities exist.
    - Stability: If the color has been stable (i.e., no artifact), the beginning border is placed at the beginning of the change.
    - Peak: If the color was defined by a peak, the beginning border is the first significant color decrease as the scan moves away from the peak.
    - Terrace: If the color was defined by a terrace, the beginning border is the first color decrease on the terrace.
    - Smear: If the color was defined by a smear, the beginning border is the steepest color slope between the smear and the valley that has no significant color decreases on the way to the valley.

Color Borders The color border is always at the steepest color slope. Extreme borders can overlap other artifacts, but color borders never overlap other artifacts. If pixels tie, the color border is the midpoint between the first and last pixels that tie.

Valley Color The valley color is the lowest color in the axial blob. If pixels tie, the valley is the midpoint between the first and last pixels that tie.

Terrace Definition: A terrace is defined by establishing the following points.

Extreme Borders: When the color level changes and exceeds the color difference, the beginning border is established. On the other side of the terrace the ending border is established with same logic but scanning in the opposite direction. Five possibilities exist.

Stability: If the color has been stable (i.e., no artifact), the beginning border is placed at the beginning of the change.

Peak: If the color was defined by a peak, the beginning border is the first significant color decrease as the scan moves away from the peak.

Valley: If the color was defined by a valley, the beginning border is the first significant color increase as the scan moves away from the valley.

Terrace: If the color was defined by a terrace, the beginning border is the first color decrease on the terrace.

Smear: If the color was defined by a smear, the beginning border is by the following conditions.

Initial Change The beginning border is placed on the initial significant change.

Same Slope The beginning border must have the same slope as the slope going into the terrace.

Color Borders The color border is always at the part of the color slope that has zero acceleration. Extreme borders can overlap other artifacts, but color borders never overlap other artifacts. If pixels tie, the color border is the midpoint between the first and last pixels that tie. In a terrace, the color border must have the following components.

Beginning Half-Slope: The beginning half-slope is the total change in color velocity from the beginning border to the zero acceleration.

Zero Acceleration: At some point in the slope, the color acceleration changes signs. If the other conditions are met, the color border of a terrace is placed on this point. If the zero acceleration exists for more than one pixel, the color border is placed at the midpoint of the pixels that have zero color acceleration.

Ending Half-Slope: The ending half-slope is the total change in color velocity from the color border to the initial stable pixel of the terrace.

Equivalent Half-Slopes: The absolute value of the difference of color in the beginning and ending half-slopes must be less than or equal to the color difference that is allowed.

Smear Definition: A smear occurs when the color is constantly changing, but it doesn't define an artifact. In practice, a smear is detected, when no artifact (e.g., peak, valley, or terrace) or stability is present. A smear is defined solely by color borders. No extreme borders are associated with a smear because smears do not have transition zones.

Color Borders: The color border of a smear is placed at the beginning of any place where nothing else exists which leaves two possibilities.

Artifacts: The color border of a smear is placed at the extreme border of an artifact.

Stability: The first pixel that is not stable becomes the color border for a smear.

Exclusive Pixels: No pixel in a smear fits inside an extreme border in either axis, and of course, no smear pixel is ever in a stable region.

Restoring Edges in the color segmentation involves identifying horizontal and vertical axial blobs in the raster image. FIG. 2A shows an example of horizontal axial blobs (highlighted in gray) identified in the raster image. The pixels with the bold numbers have the maximum color velocity in the axial blob which defines the color border. FIG. 2B shows an example of vertical axial blobs (highlighted in gray) indentified in the raster image. The pixels with the bold numbers have the maximum color velocity in the axial blob which defines the color border.

Figure 3A:
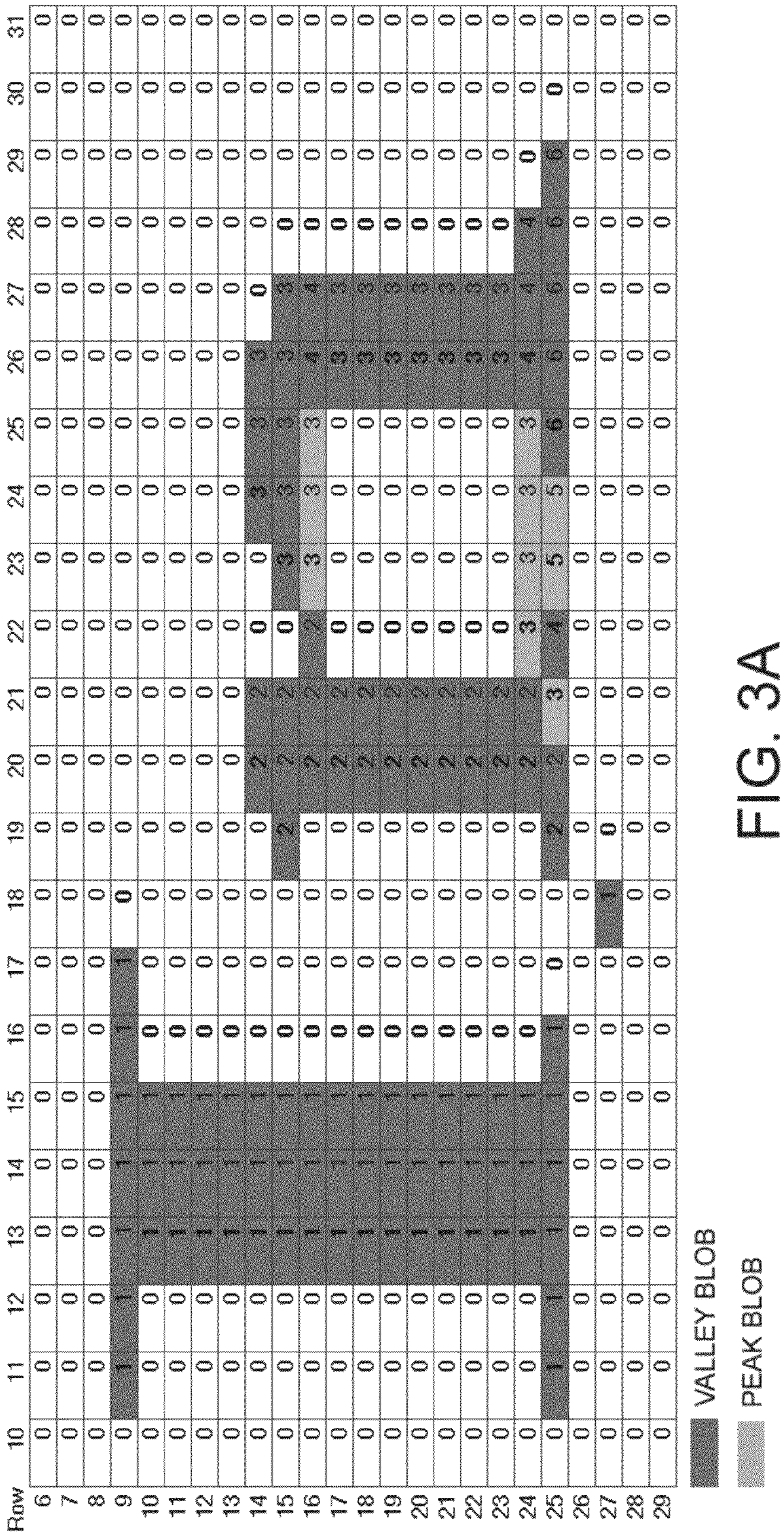
FIG. 3A shows combined horizontal axial blobs that form aggregate blobs including valley blobs and peak blobs.
Figure 3B:
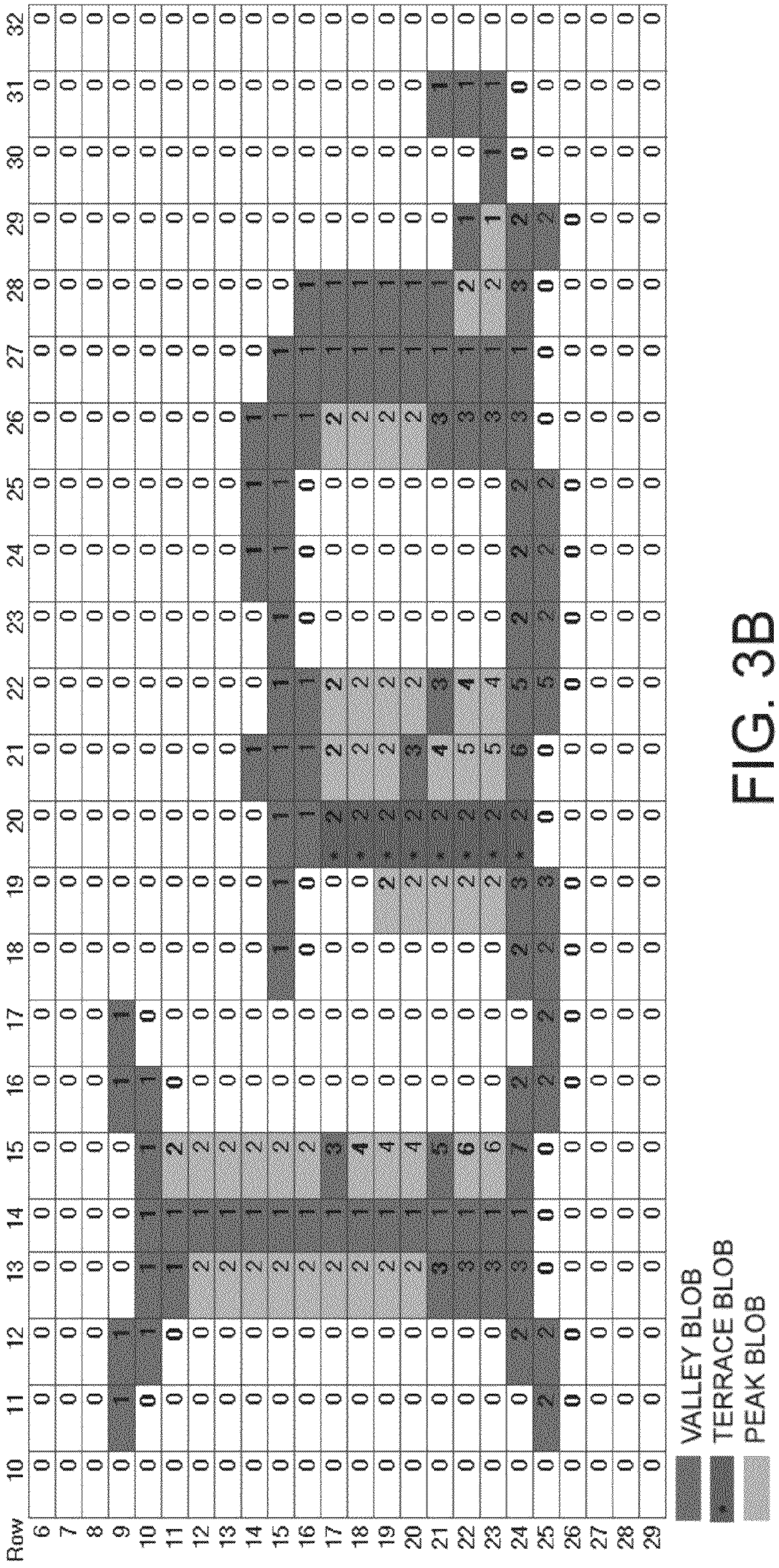
FIG. 3B shows combined vertical axial blobs that form aggregate blobs including valley blobs, peak blobs, and a terrace blob.

The next step is to combine the axial blobs of each axis to form aggregate blobs. FIG. 3A shows an example of the horizontal axial blobs combined into aggregate horizontal blobs (valley blobs and peak blobs). The pixels of each row are evaluated to determine whether the current pixel is part of the current aggregate blob, or the start of a new aggregate blob. For example, row 25 of FIG. 3A defines six aggregate blobs (numbered 1 to 6), where a new aggregate blob begins when there is a significant change in the color (color velocity exceeds a threshold). FIG. 3B shows the corresponding example when combining the vertical axial blobs into aggregate blobs (valley blobs, peak blobs, and terrace blobs). Column 21 of FIG. 3B shows an example of six aggregate blobs (numbered 1 to 6), where a new aggregate blob begins when there is a significant change in the color (color velocity exceeds a threshold).

Feature Blob Formation

Feature Blob Formation in the color segmentation involves linking the horizontal and vertical axial blobs into feature blobs using a set of rules. The first step is to scan the pixels of the image to find those pixels that have been identified as being part of a horizontal and/or vertical axial blob. If the corresponding feature (e.g., valley or peak) of the axial blob is different between the horizontal and vertical axial blob, then the axis having the predominant color velocity is used.

When finding the predominant color velocity, each pixel is checked to see whether it is in the horizontal or vertical feature blob which leaves us with four possibilities:

Neither: If the pixel belongs to neither the horizontal nor vertical feature blobs, the pixel is not included in the feature blob.

Horizontal: If the pixel belongs to the horizontal but not the vertical feature blob, the velocity on the western side of the pixel is compared to the velocity on the eastern side of the pixel. The greater velocity is the maximum horizontal velocity of the pixel. If they tie, the western velocity is the maximum horizontal velocity of the pixel. Then the velocity on the northern side of the pixel is compared to the velocity on the southern side of the pixel. The greater velocity is the maximum vertical velocity of the pixel. If they tie, the northern velocity is the maximum vertical velocity of the pixel. If the maximum horizontal velocity of the pixel is greater than or equal to the maximum vertical velocity of the pixel, the pixel is included in the feature blob. If the maximum vertical velocity of the pixel is greater than the maximum horizontal velocity of the pixel, the pixel is not included in the feature blob.

Vertical: If the pixel belongs to the vertical but not the horizontal feature blob, the velocity on the western side of the pixel is compared to the velocity on the eastern side of the pixel. The greater velocity is the maximum horizontal velocity of the pixel. If they tie, the western velocity is the maximum horizontal velocity of the pixel. Then the velocity on the northern side of the pixel is compared to the velocity on the southern side of the pixel. The greater velocity is the maximum vertical velocity of the pixel. If they tie, the northern velocity is the maximum vertical velocity of the pixel. If the maximum vertical velocity of the pixel is greater than the maximum horizontal velocity of the pixel, the pixel is included in the feature blob. If the maximum horizontal velocity of the pixel is greater than or equal to the maximum vertical velocity of the pixel, the pixel is not included in the feature blob.

Both: If the pixel belongs to both the horizontal and vertical feature blobs, the pixel is included in the feature blob.

After identifying the feature blob for each pixel according to the predominant color velocity as described above, the horizontal and vertical axial blobs are linked together using the following set of definitions and rules:

1. Pixel Neighborhood: Any linking of axial feature blobs occur between the target and linking pixel of a 3 by 3 neighborhood.
   a. Target Pixel: The target pixel is the middle pixel (pixel 5) of a 3 by 3 pixel neighborhood.

| | | |
|---|---|---|
| 1 | 2 | 3 |
| 4 | 5 | 6 |
| 7 | 8 | 9 |

b. Linking Pixel: The linking pixel can be any of the 8 neighborhood pixels that are adjacent to the target pixel.
2. Dominant Axis: The axis of a pixel with the predominant color velocity is considered the dominant axis.

Linking Rules: The axial feature blobs are linked together (if needed) to form a form a feature blob by the following rules which are given in their order of importance.

1. Dominant Axis: All pixels are placed by taking into consideration the dominant axis. The minor axis is ignored.
2. Adjacent Extreme: If the 2 pixels of extreme axial blobs are in the same 3 by 3 neighborhood and one of the 2 pixels of the extreme axial blobs is the target pixel and the two axial blobs exhibit a plausible color convergence, they are in the same feature blob. A plausible color convergence can occur from either of 2 conditions.
   a. Homogeneity: The target and linking pixels must have the same type of feature. For example, if the axial blob of the target pixel features a peak, then the axial blob of the linking pixel must feature a peak as well. The other feature type is a valley.
   b. Convergence: If the two (e.g., target and linking) extremes are opposite in type (e.g., peak or valley), then the two axial blobs are only linked together when the following conditions are met.
      A) Color Level: The color level of the valley is higher than or equal to the color level of the peak.
      B) Axial Type: The dominant axis of the target and linking pixels must be different (e.g., horizontal and vertical).
3. Matching Terrace: A matching terrace can be linked if both the conditional and color requirements are met.
   a. Conditions: Either of the following conditions allow terrace linking.
      A) Extreme and Terrace: A dominant extreme axial pixel (i.e., a pixel in an axial blob that has an extreme and the axis is the dominant axis) can be linked to a terrace if the following conditions are met.
         1) Minor Axis: Most of the terrace needs to be in the minor axis.
         2) Neighborhood Linking: The dominant terrace pixel needs to be in the same 3 by 3 pixel neighborhood as the dominant extreme pixel.
      B) Terrace and Terrace: A dominant terrace axial pixel can be linked to another terrace if the following if they are in the same neighborhood.
   b. Matching Color: The dominant extreme pixel color level must be compatible with the terrace. To calculate whether the dominant extreme pixel color level (dom_xtrm_lvl) is compatible with the terrace, the minimum (min_clr_lvl) and maximum (max_clr_lvl) color levels of the terrace are found. clr_lim=twice the maximum color limit (clr_lim is 4 if the default is used).

Then the following code can be used.

```
flg__compatible__clr( )
{
if (dom__xtrm__lvl < min__clr__lvl)
      return(max__clr__lvl − dom__xtrm__lvl <= clr__lim);
else if (dom__xtrm__lvl > max__clr__lvl)
      return(dom__xtrm__lvl − min__clr__lvl <= clr__lim);
else
      return(1);
}
```

c. Extreme Assumption: The matching terrace pixel assumes the characteristics of the dominant extreme pixel. In other words, if the dominant extreme pixel is a valley, then the terrace pixel is considered a valley as well.

FIG. 4 shows an example of feature blobs (valley feature blob and peak feature blob) that are generated after applying the above linking rules to the horizontal and vertical axial blobs described above. In the example of FIG. 4, the letter “l” in the raster image defines a single peak feature blob, and the letter “n” in the raster image defines a peak feature blob and a valley feature blob as shown. The following are examples of how the pixels in the horizontal and vertical axial blobs are linked into the feature blobs shown in FIG. 4. In the examples, each pixel is identified by column and row number Pixel (column,row):

Pixel (11,9):
Horizontal: 1st pixel of axial blob 1
Vertical: 1st pixel of axial blob 1
Dominant Axis: Vertical
Blob: The pixel is part of a feature blob.
Linking: First pixel of feature blob 0, so no linking is possible.

Pixel (12,9):
Horizontal: 2nd pixel of axial blob 1
Vertical: 1st pixel of axial blob 1
Dominant Axis: Vertical
Blob: The pixel is part of a feature blob.
Linking: Homogeneity of an adjacent extreme linking (2a) with neighborhood pixel 4.
2nd pixel of feature blob 0.

Pixel (13,9):
Horizontal: 3rd pixel of axial blob 1
Vertical: No axial blob

Dominant Axis: Vertical
Blob: The pixel is not part of a feature blob.
Pixel (14,9):
Horizontal: 4th pixel of axial blob 1
Vertical: No axial blob
Dominant Axis: Vertical
Blob: The pixel is not part of a feature blob.
Pixel (15,9):
Horizontal: 5th pixel of axial blob 1
Vertical: No axial blob
Dominant Axis: Vertical
Blob: The pixel is not part of a feature blob.
Pixel (16,9):
Horizontal: 6th pixel of axial blob 1
Vertical: 1st pixel of axial blob 1
Dominant Axis: Vertical
Blob: The pixel is part of a feature blob.
Linking: First pixel of feature blob 1
Pixel (17,9):
Horizontal: 7th pixel of axial blob 1
Vertical: 1st pixel of axial blob 1
Dominant Axis: Vertical
Blob: The pixel is part of a feature blob.
Linking: Homogeneity of an adjacent extreme linking (2a) with neighborhood pixel 4.
2nd pixel of feature blob 1.
Pixel (12,10):
Horizontal: No axial blob
Vertical: 2nd pixel of axial blob 1
Dominant Axis Horizontal
Blob: The pixel is not part of a feature blob.
Pixel (13,10):
Horizontal: 1st pixel of axial blob 1
Vertical: 1st pixel of axial blob 1
Dominant Axis Horizontal
Blob: The pixel is part of a feature blob.
Linking: Homogeneity of an adjacent extreme linking (2a) with neighborhood pixel 1. 3rd pixel of feature blob 0.
Pixel (14,10):
Horizontal: 2nd pixel of axial blob 1
Vertical: 1st pixel of axial blob 1
Dominant Axis: Vertical
Blob: The pixel is part of a feature blob.
Linking: Homogeneity of an adjacent extreme linking (2a) with neighborhood pixel 4. 4th pixel of feature blob 0.
Pixel (15,10):
Horizontal: 3rd pixel of axial blob 1
Vertical: 1st pixel of axial blob 1
Dominant Axis: Horizontal
Blob: The pixel is part of a feature blob.
Linking: Homogeneity of an adjacent extreme linking (2a) with neighborhood pixel 4. 5th pixel of feature blob 0. Homogeneity of an adjacent extreme linking (2a) with neighborhood pixel 3 which is in feature blob 1. Feature blob 1 is interlinked with feature blob 0. From now on, feature blob 1 will reference feature blob 0.
Pixel (16,10):
Horizontal: No axial blob
Vertical: 2nd pixel of axial blob 1
Dominant Axis Horizontal
Blob: The pixel is not part of a feature blob.
Pixel (13,11):
Horizontal: 1st pixel of axial blob 1
Vertical: 2nd pixel of axial blob 1
Dominant Axis: Horizontal
Blob: The pixel is part of a feature blob.
Linking: Homogeneity of an adjacent extreme linking (2a) with neighborhood pixel 2 which is in feature blob 0.
Pixel (14,11):
Horizontal: 2nd pixel of axial blob 1
Vertical: 2nd pixel of axial blob 1
Dominant Axis Horizontal
Blob: The pixel is part of a feature blob.
Linking: Homogeneity of an adjacent extreme linking (2a) with neighborhood pixel 4 which is in feature blob 0.
Pixel (15,11):
Horizontal: 3rd pixel of axial blob 1
Vertical: 1st pixel of axial blob 2
Dominant Axis Horizontal
Blob: The pixel is part of a feature blob.
Linking: Homogeneity of an adjacent extreme linking (2a) with neighborhood pixel 4 which is in feature blob 0.
Pixel (13,12):
Horizontal: 1st pixel of axial blob 1
Vertical: 1st pixel of axial blob 2
Dominant Axis Horizontal
Blob: The pixel is part of a feature blob.
Linking: Homogeneity of an adjacent extreme linking (2a) with neighborhood pixel 2 which is in feature blob 0.
Pixel (14,12):
Horizontal: 2nd pixel of axial blob 1
Vertical: 3rd pixel of axial blob 1
Dominant Axis Horizontal
Blob: The pixel is part of a feature blob.
Linking: Homogeneity of an adjacent extreme linking (2a) with neighborhood pixel 4 which is in feature blob 0.
Pixel (15,12):
Horizontal: 3rd pixel of axial blob 1
Vertical: 2nd pixel of axial blob 2
Dominant Axis Horizontal
Blob: The pixel is part of a feature blob.
Linking: Homogeneity of an adjacent extreme linking (2a) with neighborhood pixel 4 which is in feature blob 0.
Pixel (20,14):
Horizontal: 1st pixel of axial blob 2
Vertical: No axial blob
Dominant Axis: Vertical
Blob: The pixel is not part of a feature blob.
Pixel (21,14):
Horizontal: 2nd pixel of axial blob 2
Vertical: 1st pixel of axial blob 1
Dominant Axis: Vertical
Blob: The pixel is part of a feature blob.
Linking: First pixel of feature blob 3
Pixel (22,14):
Horizontal: No axial blob
Vertical: No axial blob
Dominant Axis Horizontal
Blob: The pixel is not part of a feature blob.
Pixel (23,14):
Horizontal: No axial blob
Vertical: No axial blob
Dominant Axis: Vertical
Blob: The pixel is not part of a feature blob.
Pixel (24,14):
Horizontal: 1st pixel of axial blob 3
Vertical: 1st pixel of axial blob 1
Dominant Axis: Vertical
Blob: The pixel is part of a feature blob.
Linking: First pixel of feature blob 4
Pixel (25,14):
Horizontal: 2nd pixel of axial blob 3
Vertical: 1st pixel of axial blob 1

Dominant Axis: Vertical
Blob: The pixel is part of a feature blob.
Linking: Homogeneity of an adjacent extreme linking (2a) with neighborhood pixel 4 which is in feature blob 4.
Pixel (26,14):
Horizontal: 3rd pixel of axial blob 3
Vertical: 1st pixel of axial blob 1
Dominant Axis: Vertical
Blob: The pixel is part of a feature blob.
Linking: Homogeneity of an adjacent extreme linking (2a) with neighborhood pixel 4 which is in feature blob 4.
Pixel (27,14):
Horizontal: No axial blob
Vertical: No axial blob
Dominant Axis: Vertical
Blob: The pixel is not part of a feature blob.
Pixel (18,15):
Horizontal: No axial blob
Vertical: 1st pixel of axial blob 1
Dominant Axis: Horizontal
Blob: The pixel is not part of a feature blob.
Pixel (19,15):
Horizontal: 1st pixel of axial blob 2
Vertical: 1st pixel of axial blob 1
Dominant Axis: Vertical
Blob: The pixel is part of a feature blob.
Linking: First pixel of feature blob 5
Pixel (20,15):
Horizontal: 2nd pixel of axial blob 2
Vertical: 1st pixel of axial blob 1
Dominant Axis: Vertical
Blob: The pixel is part of a feature blob.
Linking: Homogeneity of an adjacent extreme linking (2a) with neighborhood pixel 4 which is in feature blob 5. Homogeneity of an adjacent extreme linking (2a) with neighborhood pixel 3 which is in feature blob 3. Feature blob 5 is interlinked with feature blob 3. From now on, feature blob 5 will reference feature blob 3.
Pixel (21,15):
Horizontal: 3rd pixel of axial blob 2
Vertical: 2nd pixel of axial blob 1
Dominant Axis Horizontal
Blob: The pixel is part of a feature blob.
Linking: Homogeneity of an adjacent extreme linking (2a) with neighborhood pixel 4 which is in feature blob 3.
Pixel (22,15):
Horizontal: No axial blob
Vertical: 1st pixel of axial blob 1
Dominant Axis: Vertical
Blob: The pixel is part of a feature blob.
Linking: Homogeneity of an adjacent extreme linking (2a) with neighborhood pixel 4 which is in feature blob 3.
Pixel (23,15):
Horizontal: 1st pixel of axial blob 3
Vertical: 1st pixel of axial blob 1
Dominant Axis: Vertical
Blob: The pixel is part of a feature blob.
Linking: Homogeneity of an adjacent extreme linking (2a) with neighborhood pixel 4 which is in feature blob 3. Homogeneity of an adjacent extreme linking (2a) with neighborhood pixel 3 which is in feature blob 4. Feature blob 4 is interlinked with feature blob 3. From now on, feature blob 4 will reference feature blob 3.
Pixel (24,15):
Horizontal: 2nd pixel of axial blob 3
Vertical: 2nd pixel of axial blob 1
Dominant Axis: Vertical
Blob: The pixel is part of a feature blob.
Linking: Homogeneity of an adjacent extreme linking (2a) with neighborhood pixel 2 which is in feature blob 3.
Pixel (25,15):
Horizontal: 3rd pixel of axial blob 3
Vertical: 2nd pixel of axial blob 1
Dominant Axis: Vertical
Blob: The pixel is part of a feature blob.
Linking: Homogeneity of an adjacent extreme linking (2a) with neighborhood pixel 2 which is in feature blob 3.
Pixel (26,15):
Horizontal: 4th pixel of axial blob 3
Vertical: 2nd pixel of axial blob 1
Dominant Axis: Vertical
Blob: The pixel is part of a feature blob.
Linking: Homogeneity of an adjacent extreme linking (2a) with neighborhood pixel 2 which is in feature blob 3.
Pixel (27,15):
Horizontal: 5th pixel of axial blob 3
Vertical: 1st pixel of axial blob 1
Dominant Axis: Horizontal
Blob: The pixel is part of a feature blob.
Linking: Homogeneity of an adjacent extreme linking (2a) with neighborhood pixel 4 which is in feature blob 3.
Pixel (20,16):
Horizontal: 1st pixel of axial blob 2
Vertical: 2nd pixel of axial blob 1
Dominant Axis: Horizontal
Blob: The pixel is part of a feature blob.
Linking: Homogeneity of an adjacent extreme linking (2a) with neighborhood pixel 3 which is in feature blob 3.
Pixel (21,16):
Horizontal: 2nd pixel of axial blob 2
Vertical: 3rd pixel of axial blob 1
Dominant Axis: Horizontal
Blob: The pixel is part of a feature blob.
Linking: Homogeneity of an adjacent extreme linking (2a) with neighborhood pixel 4 which is in feature blob 3.
Pixel (22,16):
Horizontal: 3rd pixel of axial blob 2
Vertical: 2nd pixel of axial blob 1
Dominant Axis: Vertical
Blob: The pixel is part of a feature blob.
Linking: Homogeneity of an adjacent extreme linking (2a) with neighborhood pixel 2 which is in feature blob 3.
Pixel (23,16):
Horizontal: 1st pixel of axial blob 3
Vertical: No axial blob
Dominant Axis: Vertical
Blob: The pixel is not part of a feature blob.
Pixel (24,16):
Horizontal: 2nd pixel of axial blob 3
Vertical: No axial blob
Dominant Axis: Vertical
Blob: The pixel is not part of a feature blob.
Pixel (25,16):
Horizontal: 3rd pixel of axial blob 3
Vertical: No axial blob
Dominant Axis: Horizontal
Blob: The pixel is part of a feature blob.
Linking: First pixel of feature blob 6 which will later be abandoned.
Pixel (26,16):
Horizontal: 1st pixel of axial blob 4
Vertical: 3rd pixel of axial blob 1
Dominant Axis: Horizontal
Blob: The pixel is part of a feature blob.

Linking: Homogeneity of an adjacent extreme linking (2a) with neighborhood pixel 3 which is in feature blob 3.

Pixel (27,16):

Horizontal: 2nd pixel of axial blob 4

Vertical: 2nd pixel of axial blob 1

Dominant Axis: Horizontal

Blob: The pixel is part of a feature blob.

Linking: Homogeneity of an adjacent extreme linking (2a) with neighborhood pixel 4 which is in feature blob 3.

Pixel (28,16):

Horizontal: No axial blob

Vertical: 1st pixel of axial blob 1

Dominant Axis: Horizontal

Blob: The pixel is not part of a feature blob.

Pixel (20,17):

Horizontal: 1st pixel of axial blob 2

Vertical: 1st pixel of axial blob 2

Dominant Axis: Horizontal

Blob: The pixel is part of a feature blob.

Linking: Homogeneity of an adjacent extreme linking (2a) with neighborhood pixel 2 which is in feature blob 3.

Pixel (21,17):

Horizontal: 2nd pixel of axial blob 2

Vertical: 1st pixel of axial blob 2

Dominant Axis: Horizontal

Blob: The pixel is part of a feature blob.

Linking: Homogeneity of an adjacent extreme linking (2a) with neighborhood pixel 4 which is in feature blob 3.

Pixel (22,17):

Horizontal: No axial blob

Vertical: 1st pixel of axial blob 2

Dominant Axis: Horizontal

Blob: The pixel is not part of a feature blob.

Pixel (26,17):

Horizontal: 1st pixel of axial blob 3

Vertical: 1st pixel of axial blob 2

Dominant Axis: Horizontal

Blob: The pixel is part of a feature blob.

Linking: Homogeneity of an adjacent extreme linking (2a) with neighborhood pixel 2 which is in feature blob 3.

Pixel (27,17):

Horizontal: 2nd pixel of axial blob 3

Vertical: 3rd pixel of axial blob 1

Dominant Axis: Horizontal

Blob: The pixel is part of a feature blob.

Linking: Homogeneity of an adjacent extreme linking (2a) with neighborhood pixel 4 which is in feature blob 3.

Pixel (28,17):

Horizontal: No axial blob

Vertical: 2nd pixel of axial blob 1

Dominant Axis: Horizontal

Blob: The pixel is not part of a feature blob.

Pixel (13,23):

Horizontal: 1st pixel of axial blob 1

Vertical: 3rd pixel of axial blob 2

Dominant Axis: Horizontal

Blob: The pixel is part of a feature blob.

Linking: Homogeneity of an adjacent extreme linking (2a) with neighborhood pixel 2 which is in feature blob 0.

Pixel (14,23):

Horizontal: 2nd pixel of axial blob 1

Vertical: 14th pixel of axial blob 1

Dominant Axis: Horizontal

Blob: The pixel is part of a feature blob.

Linking: Homogeneity of an adjacent extreme linking (2a) with neighborhood pixel 4 which is in feature blob 0.

Pixel (15,23):

Horizontal: 3rd pixel of axial blob 1

Vertical: 1st pixel of axial blob 6

Dominant Axis: Horizontal

Blob: The pixel is part of a feature blob.

Linking: Homogeneity of an adjacent extreme linking (2a) with neighborhood pixel 4 which is in feature blob 0.

Pixel (30,23):

Horizontal: No axial blob

Vertical: 1st pixel of axial blob 1

Dominant Axis: Horizontal

Blob: The pixel is not part of a feature blob.

Pixel (12,24):

Horizontal: No axial blob

Vertical: 1st pixel of axial blob 2

Dominant Axis: Horizontal

Blob: The pixel is not part of a feature blob.

Pixel (13,24):

Horizontal: 1st pixel of axial blob 1

Vertical: 4th pixel of axial blob 3

Dominant Axis: Vertical

Blob: The pixel is part of a feature blob.

Linking: Homogeneity of an adjacent extreme linking (2a) with neighborhood pixel 2 which is in feature blob 0.

Pixel (14,24):

Horizontal: 2nd pixel of axial blob 1

Vertical: 15th pixel of axial blob 1

Dominant Axis: Vertical

Blob: The pixel is part of a feature blob.

Linking: Homogeneity of an adjacent extreme linking (2a) with neighborhood pixel 2 which is in feature blob 0.

Pixel (15,24):

Horizontal: 3rd pixel of axial blob 1

Vertical: 1st pixel of axial blob 7

Dominant Axis: Vertical

Blob: The pixel is part of a feature blob.

Linking: Homogeneity of an adjacent extreme linking (2a) with neighborhood pixel 4 which is in feature blob 0.

Pixel (16,24):

Horizontal: No axial blob

Vertical: 1st pixel of axial blob 2

Dominant Axis: Horizontal

Blob: The pixel is not part of a feature blob.

Pixel (17,24):

Horizontal: No axial blob

Vertical: No axial blob

Dominant Axis: Horizontal

Blob: The pixel is not part of a feature blob.

Pixel (18,24):

Horizontal: No axial blob

Vertical: 1st pixel of axial blob 2

Dominant Axis: Horizontal

Blob: The pixel is not part of a feature blob.

Pixel (19,24):

Horizontal: No axial blob

Vertical: 1st pixel of axial blob 3

Dominant Axis: Horizontal

Blob: The pixel is not part of a feature blob.

Pixel (20,24):

Horizontal: 1st pixel of axial blob 2

Vertical: 8th pixel of axial blob 2

Dominant Axis: Vertical

Blob: The pixel is part of a feature blob.

Linking: Matching terrace linking (3) with neighborhood pixel 3 which is in feature blob 3.

Pixel (21,24):

Horizontal: 2nd pixel of axial blob 2

Vertical: 1st pixel of axial blob 6

Dominant Axis: Vertical
Blob: The pixel is part of a feature blob.
Linking: Homogeneity of an adjacent extreme linking (2a) with neighborhood pixel 2 which is in feature blob 3.
Pixel (22,24):
Horizontal: 1st pixel of axial blob 3
Vertical: 1st pixel of axial blob 5
Dominant Axis: Horizontal
Blob: The pixel is part of a feature blob.
Linking: First pixel of feature blob 7.
Pixel (23,24):
Horizontal: 2nd pixel of axial blob 3
Vertical: 1st pixel of axial blob 2
Dominant Axis: Horizontal
Blob: The pixel is part of a feature blob.
Linking: Homogeneity of an adjacent extreme linking (2a) with neighborhood pixel 2 which is in feature blob 7.
Pixel (24,24):
Horizontal: 3rd pixel of axial blob 3
Vertical: 1st pixel of axial blob 2
Dominant Axis: Horizontal
Blob: The pixel is part of a feature blob.
Linking: Homogeneity of an adjacent extreme linking (2a) with neighborhood pixel 2 which is in feature blob 7.
Pixel (25,24):
Horizontal: 4th pixel of axial blob 3
Vertical: 1st pixel of axial blob 2
Dominant Axis: Horizontal
Blob: The pixel is part of a feature blob.
Linking: Homogeneity of an adjacent extreme linking (2a) with neighborhood pixel 2 which is in feature blob 7.
Pixel (26,24):
Horizontal: 1st pixel of axial blob 4
Vertical: 4th pixel of axial blob 2
Dominant Axis: Vertical
Blob: The pixel is part of a feature blob.
Linking: Homogeneity of an adjacent extreme linking (2a) with neighborhood pixel 2 which is in feature blob 3.
Pixel (27,24):
Horizontal: 2nd pixel of axial blob 4
Vertical: 10th pixel of axial blob 1
Dominant Axis: Vertical
Blob: The pixel is part of a feature blob.
Linking: Homogeneity of an adjacent extreme linking (2a) with neighborhood pixel 2 which is in feature blob 4.
Pixel (28,24):
Horizontal: 3rd pixel of axial blob 4
Vertical: 1st pixel of axial blob 3
Dominant Axis: Horizontal
Blob: The pixel is part of a feature blob.
Linking: Homogeneity of an adjacent extreme linking (2a) with neighborhood pixel 2 which is in feature blob 4.
Pixel (29,24):
Horizontal: No axial blob
Vertical: 1st pixel of axial blob 2
Dominant Axis: Horizontal
Blob: The pixel is not part of a feature blob.
Pixel (11,25):
Horizontal: 1st pixel of axial blob 1
Vertical: 1st pixel of axial blob 2
Dominant Axis: Vertical
Blob: The pixel is part of a feature blob.
Linking: First pixel of feature blob 2
Pixel (12,25):
Horizontal: 2nd pixel of axial blob 1
Vertical: 2nd pixel of axial blob 2
Dominant Axis: Vertical
Blob: The pixel is part of a feature blob.
Linking: Homogeneity of an adjacent extreme linking (2a) with neighborhood pixel 4.

2nd pixel of feature blob 2. Homogeneity of an adjacent extreme linking (2a) with neighborhood pixel 3 which is in feature blob 0. Feature blob 2 is interlinked with feature blob 0. From now on, feature blob 2 will reference feature blob 0.
Pixel (13,25):
Horizontal: 3rd pixel of axial blob 1
Vertical: No axial blob
Dominant Axis: Vertical
Blob: The pixel is not part of a feature blob.
Pixel (14,25):
Horizontal: 4th pixel of axial blob 1
Vertical: No axial blob
Dominant Axis: Vertical
Blob: The pixel is not part of a feature blob.
Pixel (15,25):
Horizontal: 6th pixel of axial blob 1
Vertical: No axial blob
Dominant Axis: Vertical
Blob: The pixel is not part of a feature blob.
Pixel (16,25):
Horizontal: 6th pixel of axial blob 1
Vertical: 2nd pixel of axial blob 2
Dominant Axis: Vertical
Blob: The pixel is part of a feature blob.
Linking: Homogeneity of an adjacent extreme linking (2a) with neighborhood pixel 1 which is in feature blob 0.
Pixel (17,25):
Horizontal: No axial blob
Vertical: 1st pixel of axial blob 2
Dominant Axis: Vertical
Blob: The pixel is part of a feature blob.
Linking: Homogeneity of an adjacent extreme linking (2a) with neighborhood pixel 4 which is in feature blob 0.
Pixel (18,25):
Horizontal: No axial blob
Vertical: 2nd pixel of axial blob 2
Dominant Axis: Horizontal
Blob: The pixel is not part of a feature blob.
Pixel (19,25):
Horizontal: 1st pixel of axial blob 2
Vertical: 2nd pixel of axial blob 3
Dominant Axis: Vertical
Blob: The pixel is part of a feature blob.
Linking: Homogeneity of an adjacent extreme linking (2a) with neighborhood pixel 3 which is in feature blob 3.
Pixel (20,25):
Horizontal: 2nd pixel of axial blob 2
Vertical: No axial blob
Dominant Axis: Vertical
Blob: The pixel is not part of a feature blob.
Pixel (21,25):
Horizontal: 1st pixel of axial blob 3
Vertical: No axial blob
Dominant Axis: Vertical
Blob: The pixel is not part of a feature blob.
Pixel (22,25):
Horizontal: 1st pixel of axial blob 4
Vertical: 2nd pixel of axial blob 5
Dominant Axis: Vertical
Blob: The pixel is part of a feature blob.
Linking: Homogeneity of an adjacent extreme linking (2a) with neighborhood pixel 1 which is in feature blob 3.
Pixel (23,25):
Horizontal: 1st pixel of axial blob 5

Vertical: 2nd pixel of axial blob 2
Dominant Axis: Horizontal
Blob: The pixel is part of a feature blob.
Linking: Homogeneity of an adjacent extreme linking (2a) with neighborhood pixel 2 which is in feature blob 7.
Pixel (24,25):
Horizontal: 2nd pixel of axial blob 5
Vertical: 2nd pixel of axial blob 2
Dominant Axis: Horizontal
Blob: The pixel is part of a feature blob.
Linking: Homogeneity of an adjacent extreme linking (2a) with neighborhood pixel 2 which is in feature blob 7.
Pixel (25,25):
Horizontal: 1st pixel of axial blob 6
Vertical: 2nd pixel of axial blob 2
Dominant Axis: Vertical
Blob: The pixel is part of a feature blob.
Linking: Homogeneity of an adjacent extreme linking (2a) with neighborhood pixel 3 which is in feature blob 3.
Pixel (26,25):
Horizontal: 2nd pixel of axial blob 6
Vertical: No axial blob
Dominant Axis: Vertical
Blob: The pixel is not part of a feature blob.
Pixel (27,25):
Horizontal: 3rd pixel of axial blob 6
Vertical: No axial blob
Dominant Axis: Vertical
Blob: The pixel is not part of a feature blob.
Pixel (28,25):
Horizontal: 4th pixel of axial blob 6
Vertical: No axial blob
Dominant Axis: Vertical
Blob: The pixel is not part of a feature blob.
Pixel (29,25):
Horizontal: 5th pixel of axial blob 6
Vertical: 2nd pixel of axial blob 2
Dominant Axis: Horizontal
Blob: The pixel is part of a feature blob.
Linking: Homogeneity of an adjacent extreme linking (2a) with neighborhood pixel 1 which is in feature blob 3.

The above-described embodiments of the present invention may be implemented using any suitable computer processor 6 (FIG. 1A) executing the steps of a computer program generated from any suitable computer programming language (e.g., C, C++, etc.). The computer program may be stored on any suitable non-transitory computer readable medium 4, such as a magnetic or optical disk, or a suitable semiconductor memory, such as flash.

What is claimed is:

1. An apparatus for processing a raster image comprising a plurality of pixels, the apparatus comprising:
- a non-transitory computer readable medium for storing steps of a computer program; and
- a computer processor connected to the computer readable medium for executing the steps of the computer program, wherein the steps of the computer program comprising:
  - means for identifying a plurality of horizontal axial blobs in the raster image;
  - means for identifying a plurality of vertical axial blobs in the raster image; and
  - means for linking the horizontal and vertical axial blobs into a feature blob.

2. The apparatus as recited in claim 1, wherein the means for linking the horizontal and vertical axial blobs into a feature blob comprises a means for linking the horizontal and vertical axial blobs into one of a valley feature blob and a peak feature blob.

3. A non-transitory computer readable medium for storing steps of a computer program, the steps of the computer program for:
- means for identifying a plurality of horizontal axial blobs in a raster image;
- means for identifying a plurality of vertical axial blobs in the raster image; and
- means for linking the horizontal and vertical axial blobs into a feature blob.

4. The non-transitory computer readable medium as recited in claim 3, wherein the means for linking the horizontal and vertical axial blobs into a feature blob comprises a means for linking the horizontal and vertical axial blobs into one of a valley feature blob and a peak feature blob.

* * * * *